Dec. 23, 1941.           C. F. WALZ           2,267,542
FROST SHIELD
Filed Jan. 21, 1941
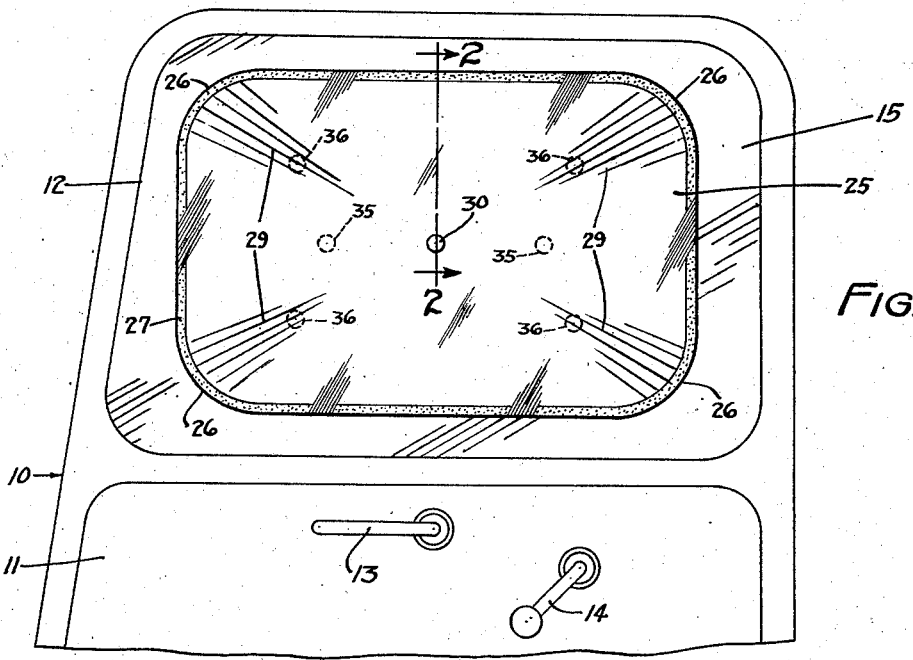
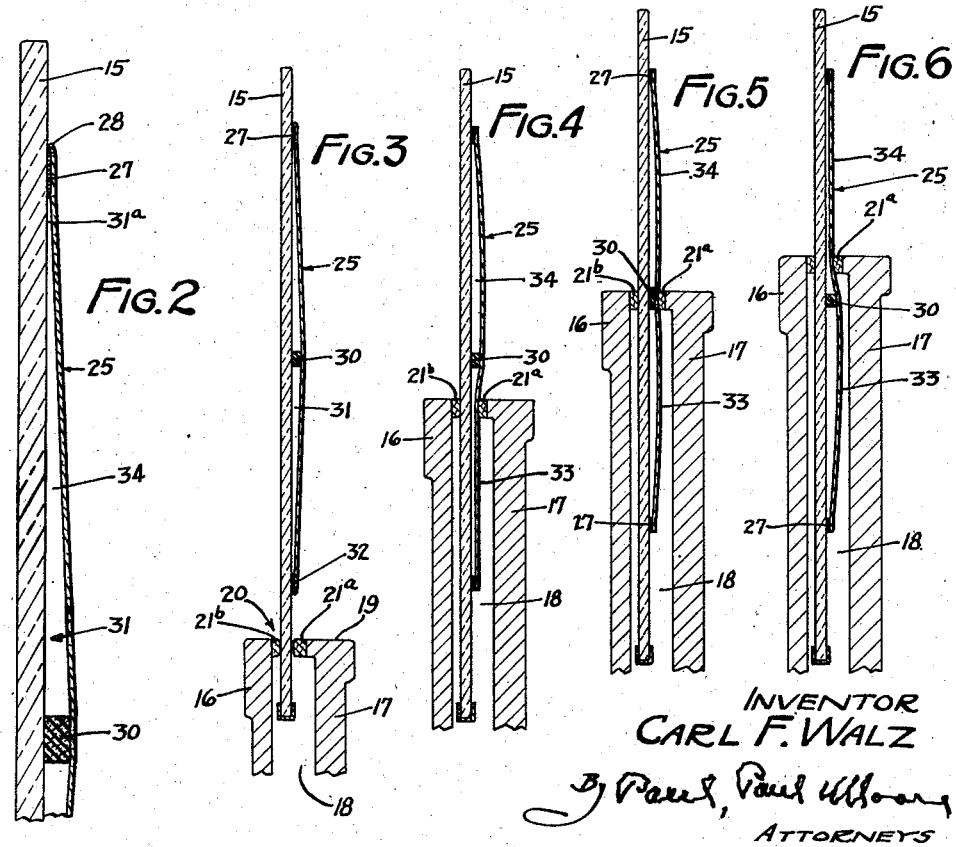
INVENTOR
CARL F. WALZ
ATTORNEYS Patented Dec. 23, 1941

2,267,542

UNITED STATES PATENT OFFICE 2,267,542

FROST SHIELD

Carl F. Walz, Minneapolis, Minn., assignor to Durkee-Atwood Company, Minneapolis, Minn., a corporation of Minnesota Application January 21, 1941, Serial No. 375,297

5 Claims. (Cl. 20—40.5)

This invention relates to improved frost shields for the window glasses of automotive vehicles.

Throughout the colder portions of the United States and elsewhere throughout the world, it is customary during the winter time to provide automotive vehicles of the closed type with devices known as "frost shields," these being usually a transparency which is applied to the glass in a fashion so as to be separated therefrom to form a dead air space between the transparency and the glass. The dead air space is sealed thereby excluding moisture and consequent frost formation upon the cold glass of the vehicle enclosure.

Heretofore, frost shields have been made of glass and have been separated from the window glass (to which the frost shield is applied) by a cementing and spacer strip which serves to form the dead air space.

The total thickness of such prior device is such that when applied to the retractable glass of an automotive vehicle door, the thickness is sufficiently great so that the frost shield will not pass through the relatively small clearance provided between the window glass and the automotive door, and as a consequence, it has been impossible to lower or retract the glass in automotive doors to which such prior frost shield devices were applied.

This invention overcomes this difficulty and at the same time provides an adequate frost shield by utilizing, as a frost shield, a thin transparent flexible membrane of resinous material which is attached to the window glass by a thin cement strip or cement area throughout the edge of the shield. The total thickness of the cement and the flexible membrane taken together is small enough so that the shield at its edge portion readily passes through close fitting window guides of automotive doors. In order, however, to provide an essential dead air space, the frost shield material is either molded so as to maintain itself in spaced relationship, or by the use of spring means is maintained in spaced relationship from the window glass, but provision is made so that the spacing between the transparency and the window glass may decrease as the window glass is retracted into its recess in the automotive vehicle body.

It is accordingly an object of the invention to provide an improved frost shield capable of being readily retracted through close fitting window glass guides in automotive bodies.

It is a further object of the invention to provide a frost shield in which the frost shield transparency is attached substantially directly to the glass and is maintained spaced from the glass and other areas of the shield.

It is also an object of the invention to provide a frost shield which is attached substantially directly to the window glass at its edges and is maintained spaced from the glass at other portions throughout the shield by means of a flexible pillar or pillars placed between the margins of the shield, preferably centrally.

It is a further object of the invention to provide a frost shield composed of an anti-static material and to provide a shield in which the cementing edge is light translucent or transparent and the frost shield transparency is molded or otherwise formed so that the edge thereof is brought into close contact with the glass to which the shield is applied thereby facilitating entrance of the shield through close fitting window glass guides.

Other objects of the invention are those inherent in and implied by the invention herein illustrated, described and claimed.

Throughout the drawing, corresponding numerals designate corresponding parts.

The apparatus is illustrated with reference to the drawing in which

Figure 1 is a fragmentary side elevational view of the inside of an automotive door showing the glass of the door in raised position and a frost shield applied thereto.

Figure 2 is an enlarged fragmentary view along the lines 2—2 of Figure 1.

Figures 3, 4, 5 and 6 are each fragmentary elevational sectional views of the upper portion of a car door showing the window glass in its raised position in Figure 3, and in successively lowered positions in Figures 4, 5 and 6.

Referring now to the drawing, the car door, generally described 10, consists of a lower panel 11 and an upper window portion 12. In the lower panel, there is mounted a door latch operating handle 13, and a crank 14 for lowering the door glass 15 into a window containing recess in the lower portion of the door.

The lower portion of the door is illustrated in Figures 3 through 6 and consists of an outer panel 16, and an inner panel 17 between which there is the window containing recess 18. In the door sill 19, there is an opening 20 having relatively close fitting compressible window guide strips 21a and 21b. The window guide strips ordinarily press against the glass so as to steady the glass. Frequently, the window guide strips 21a and 21b may be made of mohair or other such material, which may be backed by sponge rubber or other soft material or the like so as to provide the necessary resiliency. In any event, however, the spacing between the door glass 15 and the guide strips 21a and 21b is insufficient to permit the entry of the customary type frost shield which, according to prior instructions, has a thickness approximately equal to that of the door glass itself.

Referring now to Figure 1, it will be observed that the frost shield comprises a panel 25 of flexible transparent material, having rounded corners 26. Around the periphery of the panel, there is an edge strip 27 of cement, which may be merely a cemented area approximately one-fourth of an inch wide on the panel 25, or may be a piece of cloth or extruded material having cement or other tacky adhesive on both sides. This is applied to the edge as indicated in Figure 1. With such a construction, the total thickness of the cementing strip 27 is not substantially more than the thickness of the panel 25 which itself is but a few thousandths of an inch thick, and as a result, the panel is substantially in contact with the glass at its edge.

In some instances, it is desirable to bead over the edge 28 of the panel so as to actually bring the panel material into contact with the glass 15. This beading-over can be done conveniently by rubbing a blunt rounded instrument against the very edge 28 of the panel after it is applied to the window glass 15, or may be done prior to application to the glass. The edge may thereby be rounded down into contact with the glass 15 of the door as shown in the enlarged view, Figure 2.

At a central portion of the panel 15, there is preferably provided one or more compressible pillars 30, which serve to force the panel 25 outwardly at its center part thereby stressing the panel into a very shallow tent-like configuration having ridge lines generally along the diagonals of the rectangle as shown at 29. Where the shield is of relatively small size, one central pillar will ordinarily suffice, whereas for larger shields, two, four or more pillars may be used as shown by the optional locations 35 and 36 of Figure 1. In some instances, it is possible to dispense with the compressible pillar 30 where the panel 25 is initially formed so as to have the shallow tent-like configuration.

The dead air space 31 between the glass 15 and the panel 25 is of sufficient thickness throughout its free area, even at the thin parts 31a, so that frosting is inhibited throughout the frost shield area to the cement strip 27.

Referring now to Figures 3, 4, 5 and 6. These figures show a succession of views of the frost shield with the window glass 15 in the full open position, Figure 3, through a series of successively lowered positions. In Figure 3, the lower edge 32 of the frost shield is well above the close fitting window guide strips 21a and 21b, but the edge of the frost shield 32 is sufficiently thin so that it readily enters the space between the glass 15 and the close fitting window guide strips 21a when the glass is moved downwardly into space 18. It should be borne in mind in this connection that the strip 21a is usually soft, and therefore is capable of being deformed to a limited degree by the frost shield after entry has been made.

As the frost shield enters the space between the guide strips 21a and 21b, it assumes the shape and configuration shown in Figure 4, the lower portion 33 of the panel 25 being forced toward the window glass 15. The air in the space 31 is thereby forced into the upper part 34 of the frost shield and tends slightly to bulge it out.

Figure 5 illustrates the condition assumed as the compressible pillar 30 reaches the space between the window guide strips 21a and 21b. The window guide strips are of sufficient strength so that they cause an appreciable compression of the pillar 30 and consequent flattening of the frost shield along a horizontal line level with the strips 21a and 21b. This causes a slight bulging out of the lower and upper portions 33 and 34 respectively of the frost shield due to the displacement of the air in the dead air space from the middle portion with the pillar 30 into the upper and lower portions.

Figure 6 illustrates the frost shield after the pillar 30 has entered into the window containing recess. In this condition, the strip 21a enters the upper portion 34 of the frost shield closely adjacent the window glass 15 and the lower portion 33, bulged out due to the fact that the air from the upper part is transferred to the lower space.

In this way, the frost shield can readily be lowered into the window containing recess of an ordinary automotive door even though the guide strips 21a and 21b are so close fitting as to preclude a frost shield of ordinary thickness from entering.

In some instances, it is possible to dispense with the use of compressible pillar 30 by utilizing a frost shield panel 25 which is preformed by pressing preferably with heat until it has reached the pillar tent configuration illustrated in Figure 1. In this way, the flexibility of the panel itself tends to restore it to the tented configuration without the use of the compressible pillars, although by having the compressible pillar, the action is more positive.

It is preferable to use, as the flexible transparent material, a panel of synthetic resinous sheeting such as polyvinyl or methyl methacrylate or the like transparent resinous sheets, and it is preferable also to incorporate into such flexible synthetic resin sheeting an anti-static material for inhibiting the collection of dust on the surface of the flexible sheeting. For the anti-static material, there may be used surface active agents such as those disclosed in Patents 2,046,090, or 2,197,930.

Many obvious variations will be apparent to those skilled in the art and such are intended to be within the purview of the invention illustrated, described and claimed.

I claim as my invention:

1. A frost shield for use on automotive door windows of glass of the type which are retractable through close fitting window guides into a window recess in an automobile door comprising, a panel of flexible transparent material, a continuous cement strip on a face of the panel adjacent the edge thereof for cementing the panel onto the glass, the thickness dimension of the panel and cement strip at the edge of the panel, being sufficiently small so that the panel edge will start through the close fitting window guides when the window glass is drawn therethrough, and a pillar of compressible material between the glass and flexible panel for normally deforming the panel outwardly away from the glass for forming a dead air insulation space therebetween.

2. A frost shield of the type set forth in claim 1 wherein the pillar is composed of compressible rubber having a strength sufficiently great normally to deform the flexible panel outwardly but sufficiently compressible to be deformed as the pillar passes the close fitting guide during retraction of the glass panel.

3. A frost shield of the type set forth in claim 1 wherein the panel is long and rectangular and a plurality of pillars of compressible material are used along a longitudinal median line of the panel.

4. A frost shield of the type set forth in claim 1 further characterized by having the flexible transparent material permanently bent adjacent the edge of the cement strip.

5. A frost shield for use on automotive door windows of glass of the type which are retractable through close fitting window guides into a recess in an automobile door comprising a panel of flexible transparent material, cementing means for fastening the flexible transparent material onto the glass, the thickness dimension of the panel and cementing means being sufficiently small so that the panel edge will start through the close fitting window guides when the window glass is drawn therethrough, and readily compressible resilient means between the glass and the flexible panel for normally deforming the panel outwardly away from the glass for forming a dead air insulation space therebetween.

CARL F. WALZ.